(12) United States Patent
Jansson et al.

(10) Patent No.: US 9,258,379 B2
(45) Date of Patent: Feb. 9, 2016

(54) SESSION INITIATION PROTOCOL ADAPTER SYSTEM AND METHOD PROVIDING STATELESS NODE MAPPING TO A STATEFUL SERVER NODE HOSTING A COMMUNICATION SESSION FOR AN ACTOR

(75) Inventors: Andreas Jansson, San Francisco, CA (US); Grant Yang, Beijing (CN); Jack Li, Beijing (CN); Vicky Liu, Beijing (CN); Tao Ma, Beijing (CN); Peng Liu, Beijing (CN); Ting Lou, Beijing (CN); Zun Wu, Beijing (CN); Yun Gao, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 912 days.

(21) Appl. No.: 13/339,300

(22) Filed: Dec. 28, 2011

(65) Prior Publication Data

US 2012/0210012 A1  Aug. 16, 2012

Related U.S. Application Data

(60) Provisional application No. 61/428,129, filed on Dec. 29, 2010, provisional application No. 61/432,554, filed on Jan. 13, 2011.

(51) Int. Cl.
*G06F 15/16* (2006.01)
*H04L 29/08* (2006.01)

(52) U.S. Cl.
CPC .................... *H04L 67/2809* (2013.01)

(58) Field of Classification Search
USPC .......................... 709/227–228, 230
See application file for complete search history.

(56) References Cited

U.S. PATENT DOCUMENTS

| | | | |
|---|---|---|---|
| 5,961,601 A * | 10/1999 | Iyengar | 709/229 |
| 7,139,821 B1 | 11/2006 | Shah et al. | |
| 7,593,980 B2 | 9/2009 | Marascio et al. | |
| 2003/0046395 A1 | 3/2003 | Fleming et al. | |
| 2003/0191679 A1 | 10/2003 | Casati et al. | |
| 2006/0074805 A1 | 4/2006 | Svedsen et al. | |
| 2006/0294417 A1 | 12/2006 | Awasthi et al. | |
| 2007/0240166 A1 | 10/2007 | Marappan | |
| 2007/0294577 A1 | 12/2007 | Fiske | |
| 2009/0260021 A1 | 10/2009 | Haenel et al. | |
| 2009/0327929 A1 | 12/2009 | McCoy | |
| 2010/0017503 A1 | 1/2010 | Kim et al. | |
| 2011/0029812 A1 * | 2/2011 | Lu et al. | 714/18 |
| 2011/0252127 A1 * | 10/2011 | Iyengar et al. | 709/224 |
| 2011/0302570 A1 | 12/2011 | Kurimilla et al. | |

* cited by examiner

*Primary Examiner* — Jason Recek
(74) *Attorney, Agent, or Firm* — Tucker Ellis LLP (57) ABSTRACT

In accordance with various embodiments, a set of features are described for enabling an application server platform for telecom based applications. A system for providing an application server for telecom-based applications can include an application server that includes a session initiation protocol (SIP) adapter. The SIP adapter can use a connection oriented protocol and provides interactions with application code in an actor of said application server by means of asynchronized SIP protocol events. The SIP adapter can also provide stateless node mapping to a stateful server node hosting a specific session for the actor.

20 Claims, 8 Drawing Sheets

SESSION INITIATION PROTOCOL ADAPTER SYSTEM AND METHOD PROVIDING STATELESS NODE MAPPING TO A STATEFUL SERVER NODE HOSTING A COMMUNICATION SESSION FOR AN ACTOR

CLAIM OF PRIORITY

This application claims the benefit of priority to U.S. Provisional Patent Application No. 61/428,129, titled "IMPROVED APPLICATION SERVER PLATFORM FOR TELECOM-BASED APPLICATIONS", filed on Dec. 29, 2010; and U.S. Provisional Patent Application No. 61/432,554, titled "APPLICATION SERVER PLATFORM HAVING A DEPLOYMENT MANAGEMENT SERVICE, CONFIGURATION SERVICE, TCAP ADAPTER, SIP ADAPTER AND A JAVA MEDIA SERVER CONTROLLER", filed on Jan. 13, 2011; each of which applications are herein incorporated by reference.

CROSS REFERENCE TO RELATED APPLICATIONS

The present application is related to U.S. patent application Ser. No. 13/339,252, titled "IMPROVED APPLICATION SERVER PLATFORM FOR TELECOM-BASED APPLICATIONS USING AN ACTOR CONTAINER", filed on Dec. 28, 2011 ; and U.S. patent application Ser. No. 13/339,287, titled "AN EVENT BROKER FOR AN IMPROVED APPLICATION SERVER PLATFORM FOR TELECOM-BASED APPLICATIONS", filed on Dec. 28, 2011 ; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The current invention relates to mobile communications and in particular to providing application server platform for applications that utilize telecom-based functionality.

BACKGROUND

In today's world of telecommunications, more and more devices and functionalities are being integrated with one another in order to create new features and capabilities for the everyday user, as well as for large organizations and enterprises. Numerous examples of this can be seen in the realms of mobile devices, cellular phones and computers. Everything from electronic mail, internet access, text messaging, video and digital photography to video games, social networking and other forms entertainment, are becoming available for a wide variety of mobile devices. Countless web applications now provide services that can access or be accessed via mobile phone to enable a particular feature.

Given all of this pervasiveness, the management of software applications must expand in order to accommodate a multitude of mediums and modes of operation previously unconsidered by most developers. As a simple illustration, in order to allow an internet user of a web application to set up a conference telephone call between several end subscribers, the application must be able to interact in some meaningful way with multiple and substantially different protocols and networks. This is the general environment within which embodiments of the invention are intended to be used.

SUMMARY

The current invention relates to mobile communications and in particular to providing application server platform for applications that utilize telecom-based functionality. A system for providing an application server for telecom-based applications can include an application server that includes a session initiation protocol (SIP) adapter. The SIP adapter can use a connection oriented protocol and provides interactions with application code in an actor of said application server by means of asynchronized SIP protocol events. The SIP adapter can also provide stateless node mapping to a stateful server node hosting a specific session for the actor.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, a set of features are described for enabling an application server platform for telecom based applications. The application server provides a protocol-neutral programming model for application developers. Rather than having to account for specific protocol entry points into the server, all interactions in the server are abstracted as asynchronous events through the event broker layer. State management and concurrency are implemented as an actor-based model, where each actor owns its own segment of state and other actors wishing to update that state send asynchronous events to the owner. This architecture allows multiple protocols to be consumed in one process, allow applications sessions to span multiple environments and protocols, and allows the programming model to be decoupled from any particular protocol entry point.

Glossary

In accordance with an embodiment, the following terms as used herein are defined below:

Actor: An entity in the Actor Mode, with runtime properties provided by the Actor Container.
Actor Container: Set of bundles and function responsible for providing APIs and runtime environment for actor based applications.
Actor Framework: Usually a synonym of Actor Container.
Actor Factory: Factory used to request creation of other actors.
Actor Links: Hint that an actor being created is linked to the creator and that optimizations on communication with it would be greatly beneficial.
Actor Model: Mathematical model representing an event based actor programming model through use of the actor container.
Actor Store: Actor specific store with isolated view of data written by this actor; see also Storage Service.
APE: See Actor Protocol Extension.
Actor Protocol Extension: Protocol adapter extension to actors that send and/or receive events from mentioned Protocol adapter.
Bundle: OSGi bundle, deployment artifact consisting of jar file with OSGi specific manifest properties.
Coherence: Oracle Coherence.
Declarative Services: OSGi compendium specification for OSGi service dependency definition and injection.
Event Broker: System feature for managing events.
Event Channel: An abstraction for application events sent from many to one subscribing actor over typed event channels; also the client side interface used to publish such events.
Event Channel Factory: Factory used to create event channel ports and open/subscribe handlers to event channels.
Event Channel Port: Template that can be used to reserve a channel of a specified type to be opened at a later time, possibly by another actor.
Event Channel Session: Session representing an open channel; this is used to later close and unsubscribe from the channel.
Falcon: A particular embodiment of the event based platform developed for OCCAS.
OCCAS: Oracle Communications Converged Application Server, a product family that includes a SIP server.
OSGi: A set of service platform and framework specifications.
Protocol Extension: See Actor Protocol Extension.
Storage Service: feature managing cluster storage.
TCAP: User Protocol SS7 application protocols built upon TCAP layer, eg. CAP2, MAP, INAP.
CAP: CAMEL Application Part.
MAP: Mobile Application Part.
ANTLR: BNF parser.
SSN: SubSystem Number of SS7.
SPC: Signal Point Code.
EB: Event Broker.
PAC: Protocol Adapter Container.
JAIN: Java APIs for Integrated Networks.
APE: Actor Protocol Extension, can be used interchangeably with Actor Protocol Context.
API: Application Programming Interface.
OAM: Operating, Administration, Management.
SIP: Session Initiation Protocol.
PEF: Protocol Event Factory.
PA: Protocol Adapter.
PE: Protocol Extension.
PR: Protocol Router.

Figure 1:
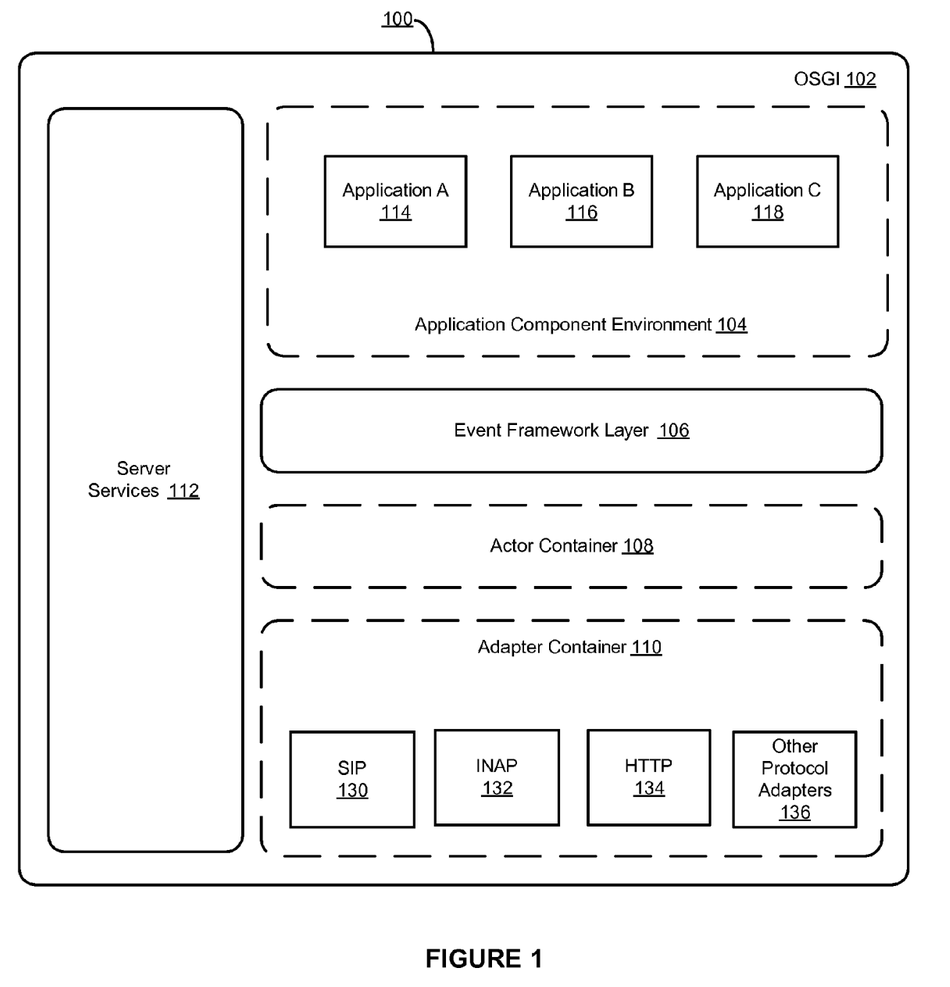
FIG. 1 is a functional illustration of an application server, in accordance with various embodiments of the invention.

FIG. 1 is a functional illustration of an application server, in accordance with various embodiments of the invention. Although FIG. 1 depicts components as logically separate, such depiction is merely for illustrative purposes, and the components illustrated therein can otherwise be combined or divided into separate software, firmware and/or hardware. Furthermore, such components, regardless of how they are combined or divided, can execute on the same computing device or can be distributed among different computing devices connected by one or more networks or other suitable communication means.

As illustrated in FIG. 1, in accordance with an embodiment, the application server 100 can include an OSGI kernel 102, an application component environment 104, an event framework layer 106, an actor container 108, an adapter container 110, and a selection of server services 112.

The OSGI kernel provides lifecycle management, class loading, dependency resolution and deployment features for the application components on the server. In accordance with an embodiment, the application components, such as applications 114, 116, 118, can be basic OSGI bundles deployed on the server.

The event framework layer provides an event-based communication model between the application component environment and the adapter container. In particular, the framework layer provides an event broker that maps all protocol-specific communications exposed by the various protocol adapters 130, 132, 134, 136 into asynchronous events, which can be consumed by the application components. Additionally, the application components can produce asynchronous events for propagation to the protocol adapters via the event broker.

The protocol adapters 130, 132, 134, 136 enable the application server to support multiple protocols. In accordance with an embodiment, each of a plurality of various protocols, such as a session initiation protocol (SIP) 130, an intelligent network application part (INAP) of the SS7 protocol 132, a hypertext transfer protocol (HTTP) 134, or many other protocols 136, can have their own adapter. These protocol adapters then interface with the adapter container, the event framework, the actor container and the server services. The adapter container can expose a service provider interface, for use in building new protocol adapters as new protocols emerge or become more widely used.

In accordance with an embodiment, the event framework layer is used to communicate with application components. With respect to the event model, the protocol adapters are consumers and producers of asynchronous events. The SPI interfaces implemented by protocol adapters reflect the complexity relative to application components. Primarily, adapters implement efficient input and output operations (I/O)

towards a specific protocol. In addition, protocol-specific security, error handling, and abstraction can be encapsulated in adapters. The adapter container is designed to support a contract in which it cooperates with the adapters to provide connectivity to the network by the application components.

The server services act as basic building blocks for the rest of the functionality implemented on the application server. In accordance with an embodiment, these services are protocol neutral, reusable, and shared by the other layers of the stack. The set of services illustrated in FIG. 1 is not intended to be limiting or exhaustive, and is instead being provided for purposes of illustration. In accordance with an embodiment, various server services can be implemented as needed to address the particular needs of an application developer. For example, a clustering service can be used to maintain cluster membership/replication, while an SLA management service can be used to keep track of service level agreement (SLA) enforcement.

TCAP Adapter

In accordance with an embodiment of the invention, the application server platform can automatically generate protocol adapters (processors/translators) based on abstract lexical notation, such as Abstract Syntax Notation One (ASN.1). For example, the application server platform includes a Transaction Capabilities Application Part (TCAP) Adapter that is based upon the TE TCAP stack. This TCAP adapter can also support CAMEL Application Part (CAP)/Mobile Application Part (MAP) and other TCAP user protocols by receiving ASN.1 files as input.

In accordance with an embodiment, the TCAP adapter provides integration with the Protocol Adapter Container. Additionally, the TCAP adapter can decode and encode CAP/MAP/INAP, and encapsulate operations in unified TCAP layout. The TCAP adapter can also automatically generate CAP/MAP/INAP layers, using ASN1 files as input. The TCAP Adapter works like a "container" to support CAP, MAP, INAP or other customized TCAP user protocols. Further, the TCAP adapter can transfer JAIN TCAP messages to applications as a TCAP event, and similarly can convert a TCAP event to a JAIN TCAP message to be sent to network nodes.

Figure 2:
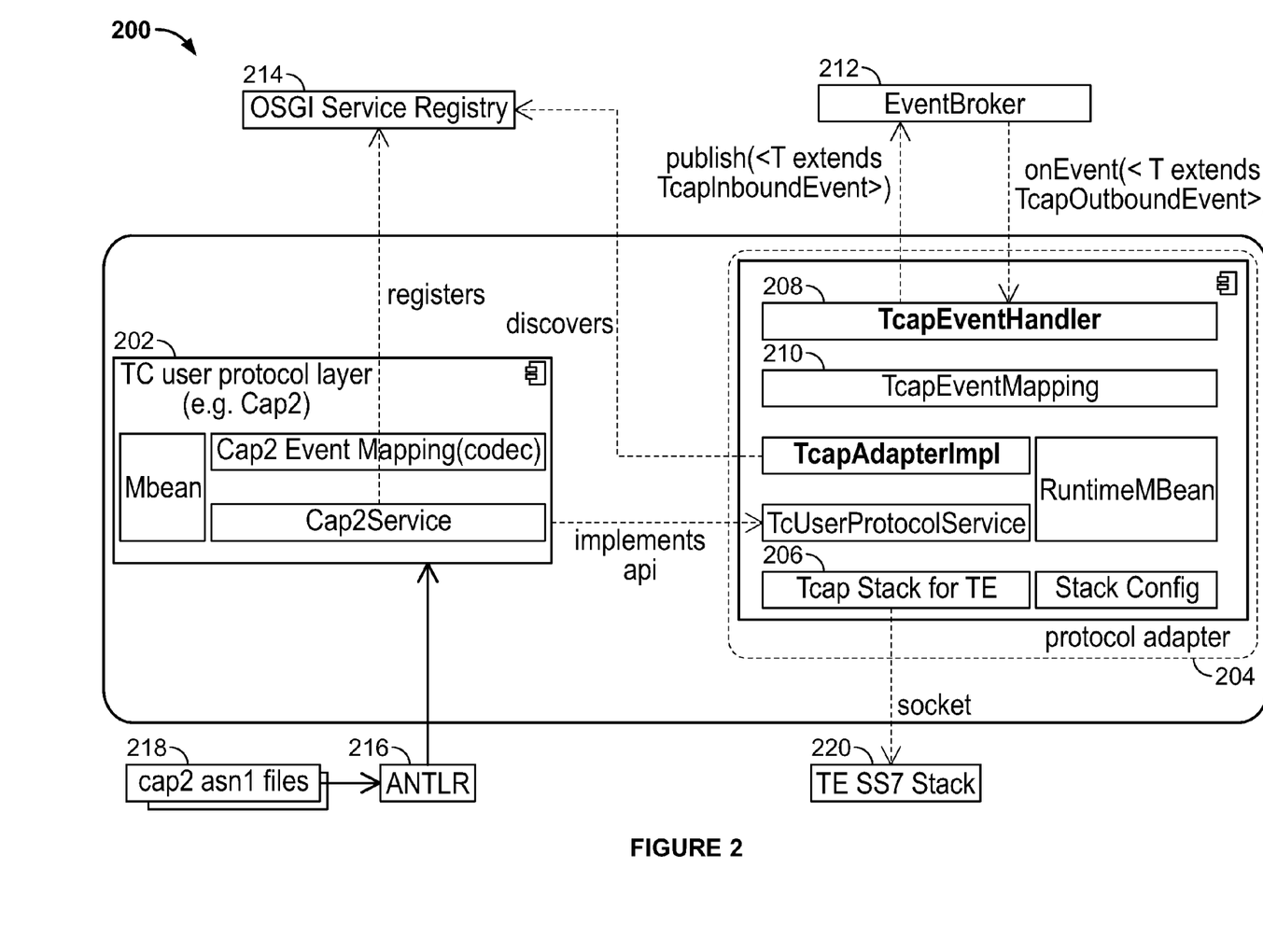
FIG. 2 is an illustration of an application server including a TCAP adapter, in accordance with an embodiment.

FIG. 2 is an illustration of an application server including a TCAP adapter, in accordance with an embodiment. As shown in FIG. 2, the application server 200 can include a CAP2 layer 202 and a TCAP adapter 204. The CAP2 layer is generated by ANTLR with asn1 files as input. The generated codes implement TCAPUserProtocolService and register it into an OSGi Service Registry. The TCAP Adapter uses the OSGi Service Registry to discover all TCAP user protocol services, and to decode/encode protocols upon the TCAP layer. The TCAP Adapter can include a TCAP stack 206 for TE which is the TE client implementation. It can also include a TCAP event handler 208 and TCAP event mapping 210 through which the TCAP adapter can communicate with an event broker 212 to publish and subscribe to specific events.

An event API (TCAPOutboundEvent/TCAPInboundEvent) is provided to facilitate communication between applications and TCAP adapter. An additional API is provided for child event objects (Cap2OutboundEvent/Cap2InboundEvent), this API can be extended from TCAPOutboundEvent/TCAPInboundEvent. An OSGi Service Registry 214 is used to register and find specific service. ANTLR 216 is an ASN1 parser to parse ASN1 files 218 and generate java classes. Additionally, a TE SS7 server 220 is provided.

The TCAP inbound/outbound Event API can organize inbound and outbound events in a hierarchy. The two interfaces are defined to communicate with the event broker, one for inbound events and one for outbound events. Regardless of the particular TCAP user protocol used, a unified TCAP event API is exposed to applications. An empty interface can be provided (for example, an empty "Argument" interface), which can operate as a placeholder for all possible operations. This can be used to distinguish between different TCAP user protocols. For example, !InitialDP in CAP 2 can extend from "Argument", thus be put into a TCAPInboundEvent and sent to applications. In accordance with an embodiment, the TCAP event API definition refers to the standard JAIN TCAP API. Similar naming conventions can be followed, like InvokeIndPrimitive and InvokeReqPrimitive: "Ind"=indication(inbound), "Req"=request(outbound)

The TCAP Outbound Event Factory can be used to create outbound events. Additionally, CAP2 and Map Outbound event factories can be provided which include TC-user specific methods.

Figure 3:
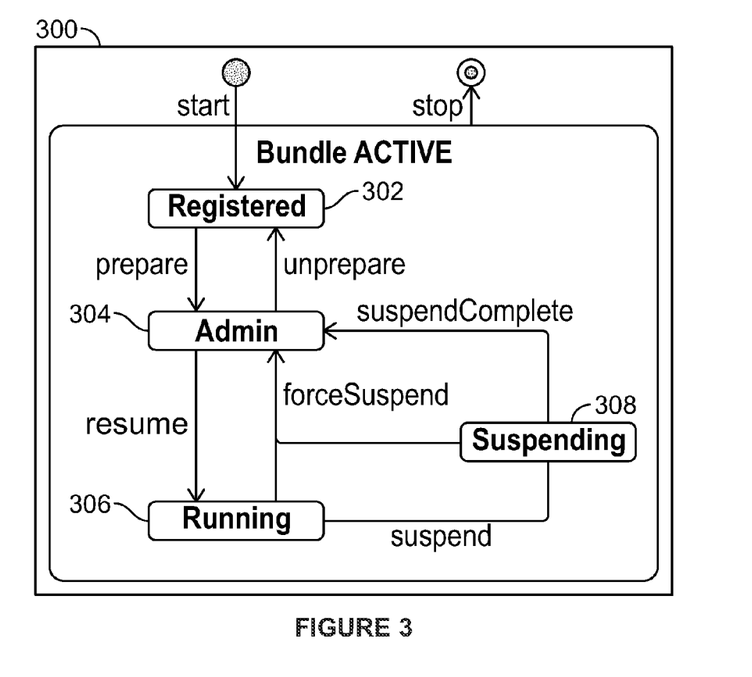
FIG. 3 shows the TCAP Adapter Lifecycle, in accordance with an embodiment. At 300, the lifecycle starts.

FIG. 3 shows the TCAP Adapter Lifecycle, in accordance with an embodiment. At 300, the lifecycle starts. Once started, the TCAP Adapter registers it's TCAPProtocolAdapterFactory in the OSGi registry. The TCAP Adapter can receive related context from Adapter container. At 302, the TCAP adapter is registered and can begin the prepare phase. At this point, the TCAP Adapter can register MBeans and event handlers, and can listen and expose OSGi services, but cannot start accepting traffic. At 304, the TCAP adapter is in the Admin state and is set to be activated and start processing traffic. At 306, the TCAP adapter is running, it can accept traffic. At 308, the TCAP adapter is in the suspended state. At this point the adapter is set to be deactivated, and it denies new request but keeps handling current requests. Once the suspend is complete, the TCAP adapter returns to the Admin state where it unregisters MBeans, event handlers, and OSGi services. It can then cleanup all resources allocated in the prepare transition.

In accordance with an embodiment, the TCAP Adapter can provide a plurality of functions. For example, it can interact with the EventBroker to perform handler registration, inbound event publishing, and outbound event handling. It can also interaction with the TE stack to perform binding, and receiving/sending JAIN TCAP messages; and can perform mapping between Events and JAIN TCAP messages. The TCAP adapter can also server as a container for TCAP user protocol layers and provide basic TCAP FSM control.

In accordance with an embodiment, the TCAP Adapter includes a plurality of modules. The TCAP API module, includes the TcUserProtocolService, and is a user protocol layer which implements the API and registers itself to the TCAP Adapter. The TCAPAdapterImpl implements ProtocolAdapter, integrates with PAC, and realizes the lifecycle control. The TCAPEventHandler implements EventHandler <TCAPOutboundEvent>, TCAPOutboundEventProcessor, and is responsible for receiving TCAP events from the EB, and publishing TCAP events to the EB. The TCAPEventMapping module maps between TCAPInbound/OutboundEvent and JAIN TCAPMessages. The TE stack for TE module implements TCAPEventListener, and encapsulates JAINTCAPProvider, JAINTCAPStack. This module is the TE client implementation to communicate with the TE server, and is responsible for binding with the TE server, and for receiving and sending JAIN TCAP messages. The RuntimeMbean can be used to show statistics, stack status, and reset connections. A configuration module uses the ConfigurationService to configure the TE client info to TE server. The TCAP FSM module is a lightweight FSM control (supplement for TE TCAP stack) for every dialogue, e.g. Application context name checking and reloading, original address filling basic call state control for TC—Begin, Tc—Continue and Tc—end, etc In accordance with an embodiment, a TcUserProtocolService API is exposed to the TC user layer to implement, then is registered to OSGi service registry. After the TC user layer is started, the TCAP adapter can listen to them and hold the references.

Figure 4:
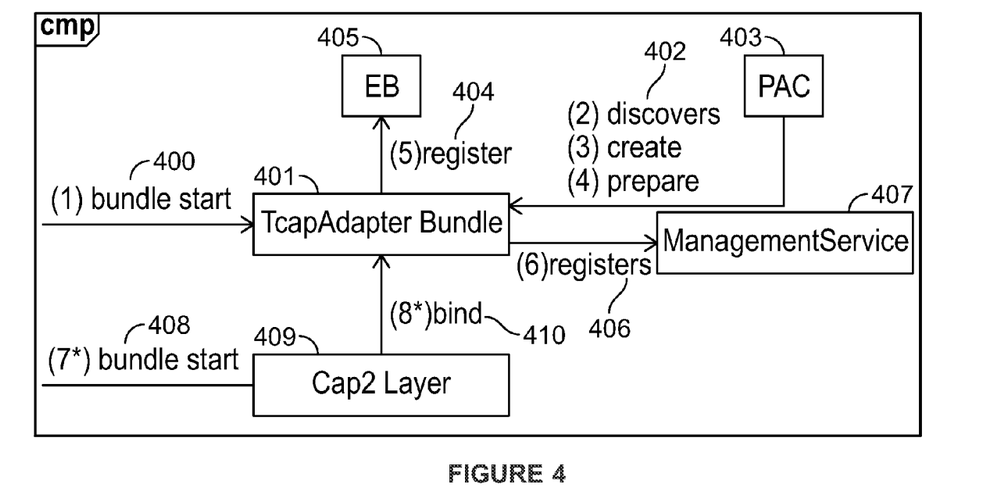
FIG. 4 shows TCAP adapter startup, in accordance with an embodiment. At 400 the bundle 401 is started.

FIG. 4 shows TCAP adapter startup, in accordance with an embodiment. At 400 the bundle 401 is started. At 402, the protocol adapter container (PAC) 403 discovers, creates, and prepares the bundle. At 404, the TCAP adapter registers with the event broker (EB) 405 and at 406 the TCAP adapter registers with a management service 407. At 408, the CAP2 layer 409 starts and at 410 it binds with the TCAP adapter.

Figure 5:
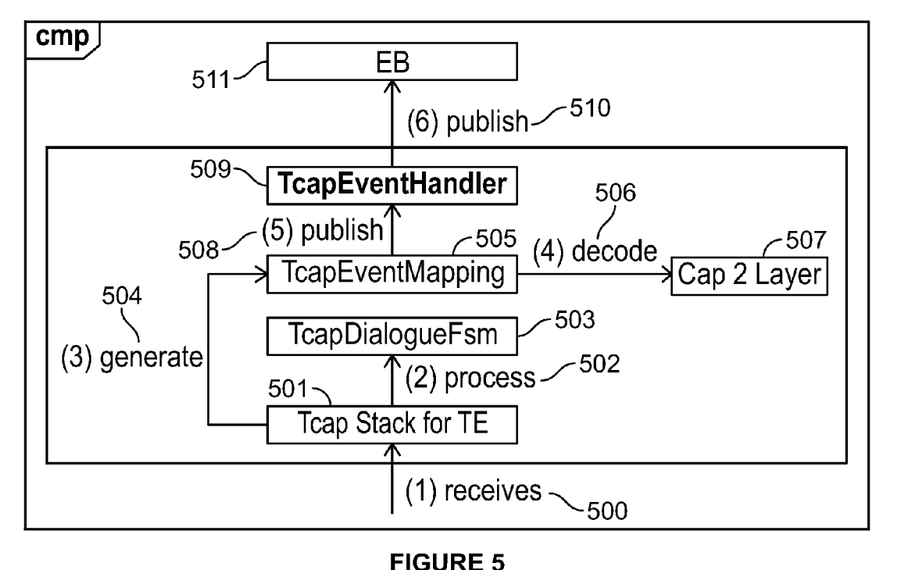
FIG. 5 shows publication of an outbound message, in accordance with an embodiment.

FIG. 5 shows publication of an outbound message, in accordance with an embodiment. At 500, a message is received at the TCAP stack 501. The message is processed 502 by the TCAP dialogue FSM 403 and sent 504 to the TCAP event mapping module 505. The message is decoded 506 using the CAP2 layer 507. The message is then published 508 to the TCAP event handler 509 which publishes 510 it to the Event Broker (EB) 511. This process is substantially reversed for inbound messages.

In accordance with an embodiment, all normal incoming TCAP messages are scheduled by the single TE stack thread to keep the messages in order. That is, the TCAP adapter gets all TCAP messages in the same TE thread. To enhance the performance and ensure the correct order, the TCAP adapter can collect one dialogue event and multiple component events in the same dialogue and put them into a cache. After the last component has arrived, it can create another thread to handle those messages and publish them as one event. The EB does not guarantee the order of events.

The callback operations of the TCAPEventListener are called by different threads. A first thread, the indication event thread, can call the process VendorIndEvent, process ComponentIndEvent and process DialogueIndEvent operations when a TCAP indication event is addressed to the listener. There is one indication event thread for each JAINTCAPProvider that the listener is added to. This thread can also call the getUserAddress List operation. From J-TCAP R3 this thread can also call the process TCAPError operation, but not at the same time as the Error event thread. A second thread, the error event thread, can call the process TCAPError operation when an error has occurred in the JTCAP that cannot be thrown as exception, for example errors with the connection to the attached stack. There is one error event thread for each JAINTCAPProvider that the listener is added to. This thread can also call the getUserAddress List operation. Additionally, user threads are threads that the JTCAP-user uses to call one of the operations in the JAINTCAPProvider or the JAINTCAPStack. These threads can call the getUserAddress List operation. To avoid threading problems, all data that is updated by more than one thread in the listener, must be thread safe. Thread safe means that the data update is atomic or synchronized; and that no dead locks are possible.

All TCAP outbound events are scheduled by the EB in a separate thread by a DefaultScheduler. The TCAP adapter can handle the event within the EB's thread space, but the EB's thread pool is shared between all adapters. For safe usage, the TCAP adapter can schedule a new work thread via a work manager of the PAC and end the EB's thread.

In accordance with an embodiment, the TCAP User Protocol(CAP2/MAP/ . . . ) layer can include a plurality of modules. The modules support automatic generation. For every TCAP user protocol, ASN1 files are the only input. ANTLR is a powerful BNF parser, with ASN1 files and ANTLR, implementation codes can be generated. These codes can include Event API, the data type API called by Event and Event Factory API; Event implementation, encoder and decoder and Event Factory implementation; Implementation of api Tc UserProtocolService; and RunTime MBean & persistence configuration.

In accordance with an embodiment, OctetString is a specific data type in ASN1. It is a byte array, but sometimes the value is encoded in a specific way, and the rule is described in comments of ASN1 file. So the ASN1 parser cannot always recognize it and automatically encode it. For these data types a utility can be used for reliable and automatic encoding and decoding. The utility can decode so that applications can get a specific data object from an OCTETString(byte array); and encode so that applications can get a byte array from a specific data object.

The TCAP adapter can include a plurality of configuration and management functions. For example, the Runtime MBean can include a resetStackConnection, which is a method that resets the connection towards the TE server. It can also include an is ActiveStack method which shows the client connection status. A listAllTcUserProtocols method can list all registered TC user protocols names and their SSNs. A listStatistics method can list specific SSN related statistics, including total dialogues, total handled events. Similarly, these statistics can be reset using a resetStatistics method.

The Cap2 layer can also include a plurality of functions. These functions can include a registerAddress method which is used to register a current SSN into the TCAP Adapter. This method can check whether this SSN has been added by the Configuration Service. If the SSN does not exist, then the method will throw an exception. This method can also invoke TCAPConfigService's registerTCAPListener(protocolname,ssn) method. An unregisterAddress method can be used to unregister a TCAP Address by SSN, This method can check whether this SSN has been removed by the Configuration Service. If the SSN exists, the method will throw an exception. This method can also invoke TCAPConfigService's unregisterTCAPListener(protocolname,ssn) method. A listAllSSN method can be used to list all registered SSN in the current protocol service. A listOperationTimer method can list all defined OperationTimers in the current protocol service.

In accordance with an embodiment, the mapped MBean attributes can include an SSN list, which is a list of the SSNs in the current protocol service. The MBean attributes can also include a Timer List which is a list of the current TimerLists in the current protocol service.

Figure 6:
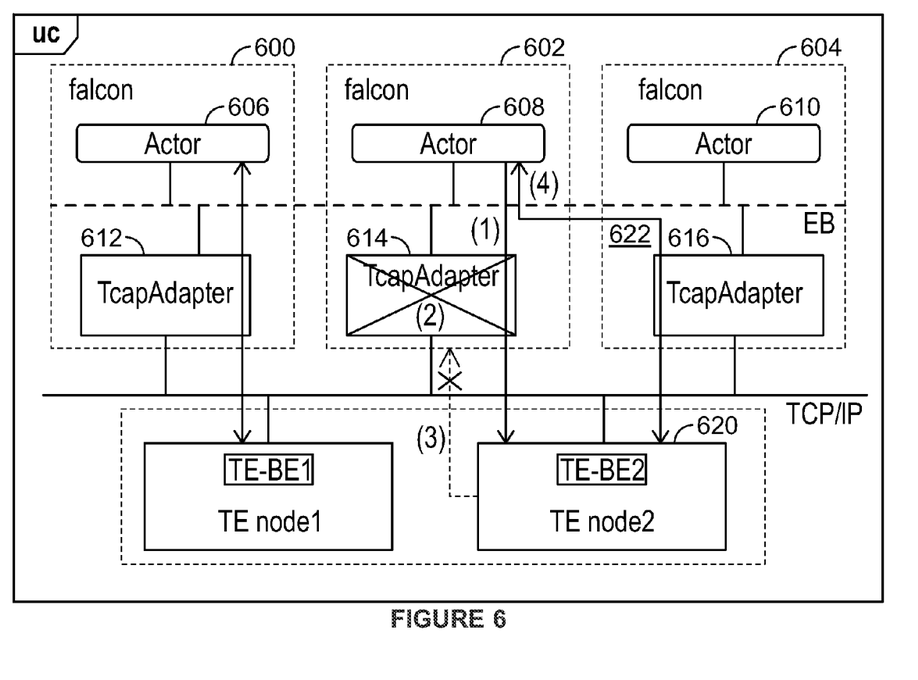
FIG. 6 shows an example of fail over when a TCAP adapter shuts down, in accordance with an embodiment.

FIG. 6 shows an example of fail over when a TCAP adapter shuts down, in accordance with an embodiment. TCAP adapter fail over can depend on the TE stack's fail over functions. Although current dialogues will likely be lost, new triggered dialogues can be routed into healthy nodes. A plurality of application server instances 600, 602, 604 are shown, each with their own actors 606, 608, 610 and TCAP adapters 612, 614, 616. At 618, actor 608 sends a TCAP message to TE HD node2 620. The message includes a dialogue ID. When the TCAP adapter 614 fails or shuts down, the messages associated with the dialogue ID are lost. After the shut down, the actor can send out TCAP message with a new dialogue ID, and the new dialogue can be routed 622 to a healthy TCAP adapter 616 in a different application server instance.

Figure 7:
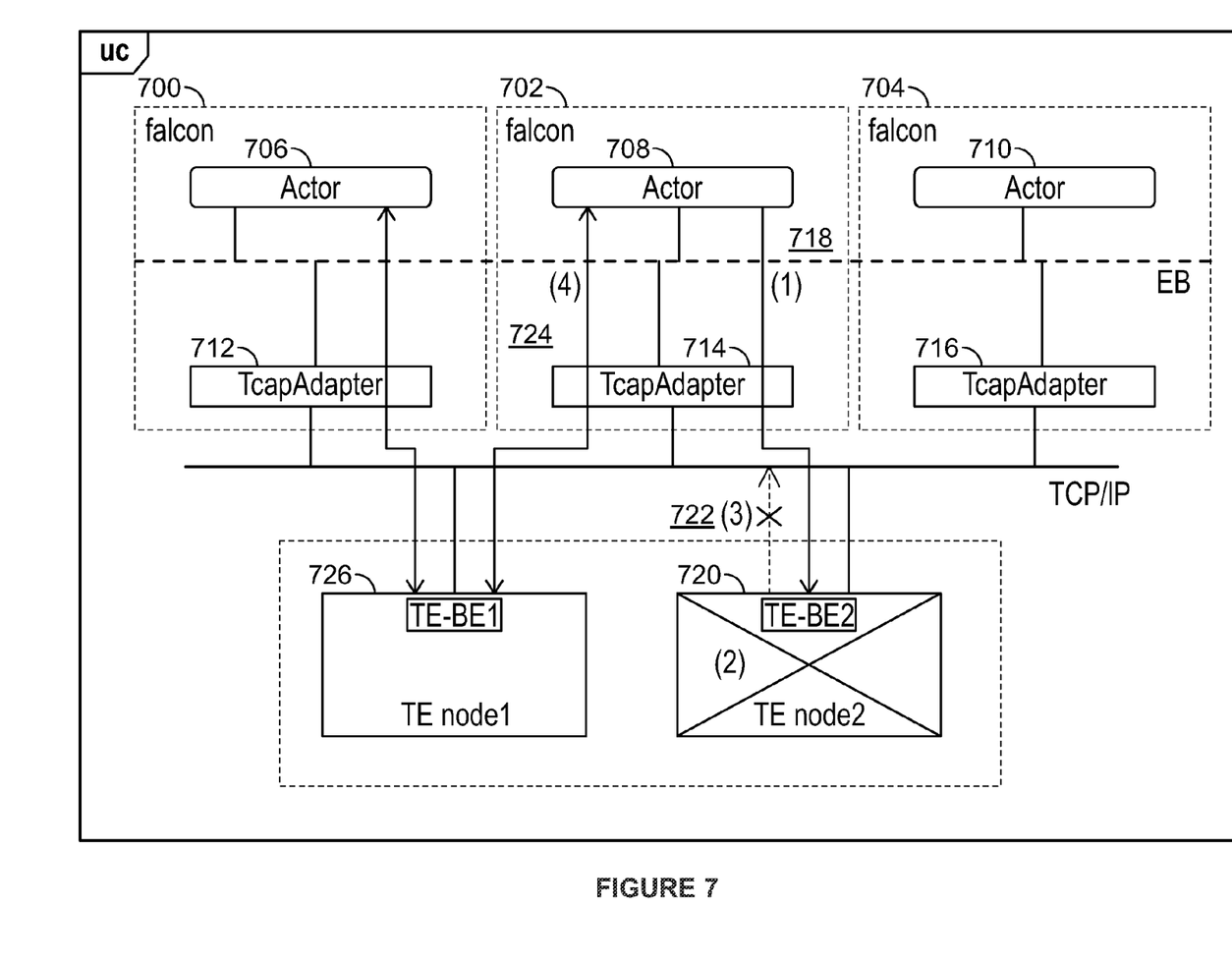
FIG. 7 shows an example of fail over when a TE stack node shuts down, in accordance with an embodiment.

FIG. 7 shows an example of fail over when a TE stack node shuts down, in accordance with an embodiment. A plurality of application server instances 700, 702, 704 are shown, each with their own actors 706, 708, 710 and TCAP adapters 712,

714, 716. At 718, actor 708 sends a TCAP message to TE HD node2 720. The message includes a dialogue ID. At 722, the TE node2 shuts down and the messages associated with that dialogue ID are lost. Subsequent messages sent from the actor are sent with a new dialogue ID, the new dialogue can then be routed 724 to TE HD node1 726.

SIP Adapter

In accordance with an embodiment, the application server platform includes a session initiation protocol (SIP) adapter. The SIP adapter uses a connection oriented protocol and provides interactions with application code in an actor by means of asynchronized SIP protocol events. The SIP adapter also provides stateless node mapping to a stateful server node hosting a specific session for the actor.

Figure 8:
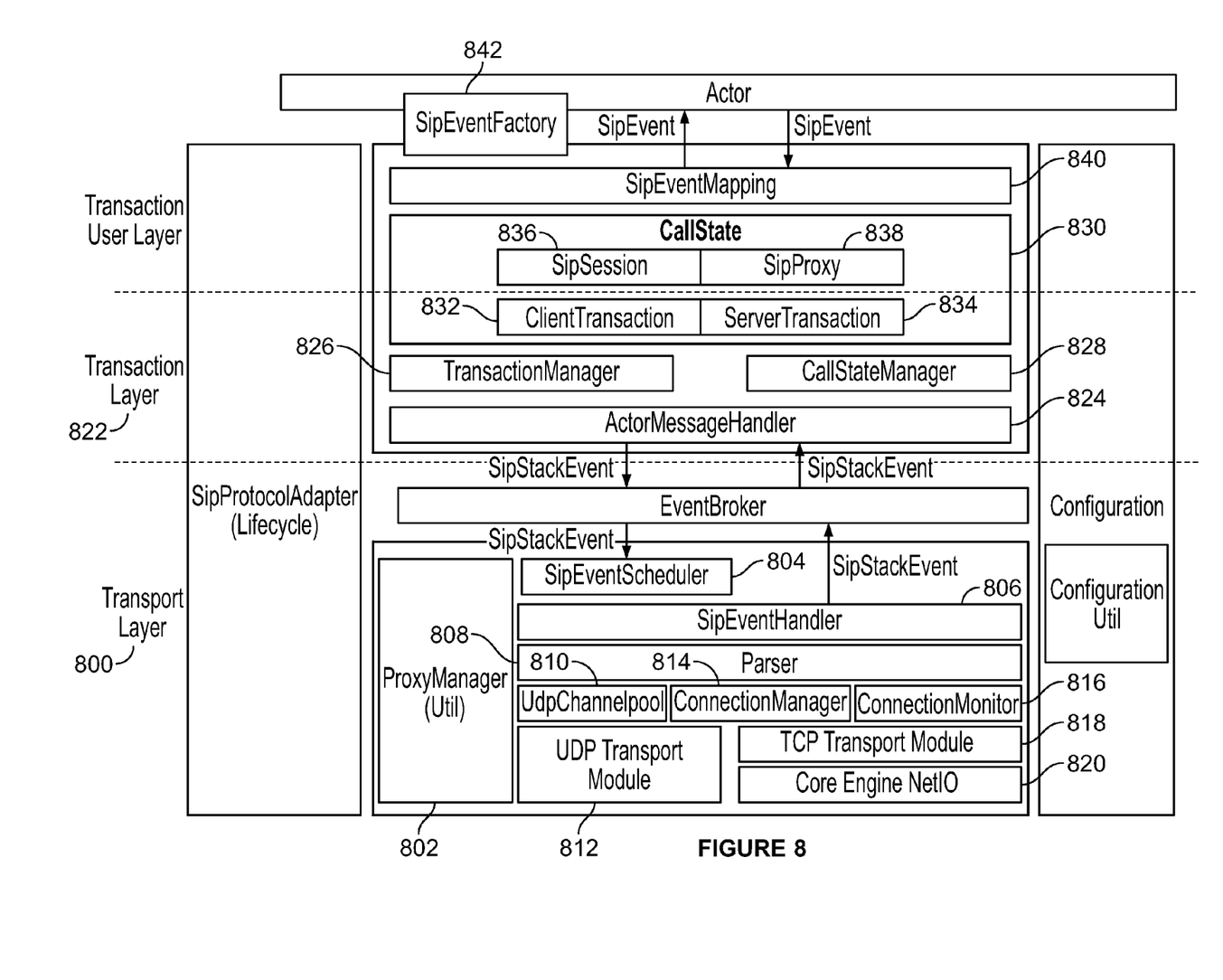
FIG. 8 shows module a diagram of the modules of a SIP adapter, in accordance with an embodiment.

FIG. 8 shows module a diagram of the modules of a SIP adapter, in accordance with an embodiment. The transport layer 800 can include a plurality of sub-modules. The Proxy-Manager 802 is a singleton utility class, which can connect to lifecycle, configuration and other sub-modules. The SipEventScheduler 804 uses the PAC provided workManager to schedule the outbound event from app/transaction layer. The SipEventHandler 806 can dispatch stack events in bi-side, and take care of the connection_id attribute and transport_id attribute in Stack events. The Parser 808 can parse the frame from the network into a StackEvent. The UdpChannelPool 801 can pre-buffer the UDP network resources and re-use them to dispatch outbound events. The UdpTransportModule 812 can use JDKNIO to interact with sockets. The ConnectionManager 814 can buffer the TCP network connections and re-use them for receiving/sending event to network. The ConnectionMonitor 816 can monitor for dead connections, shut down the connections and release resources. The TcpTransportModule 818 can use CENetIO 820 to interact with sockets.

In accordance with an embodiment, for UDP transporting, there can be one permanent thread listening for all inbound event from pre-configured network access points. The work manager is not used here, because this thread is time critical and not supposed to be re-used by other modules. For TCP transporting, the thread mode of inbound event is selected according NetIO implementation. For both TCP and UDP transporting, outgoing events are handled by the SipEventScheduler, which relies on the PAC assigned work manager to schedule the thread.

In accordance with an embodiment, the transaction layer 822 can also include a plurality of submodules. The ActorMessage Handler 824 handles incoming/outgoing stack events from/to protocolExtension (PE). The TransactionManager 826 is a utility to create and manage server/client SIP transactions and put them into call state object maintained by the Call State Manager 828. The Call State Manager is a utility to create/retrieve/manage SIP call states. A CallState 830 is a storage object which includes a transaction object, sip session object and associated states which have to be persisted in storage service to handle fail-over. The ClientTransaction 832 can include a protocol layer state machine of the transactions initialized from outbound event. The ServerTransaction 834 can include a protocol layer state machine of transactions initialized from incoming event. The SipSession object 836 can include several transaction objects, and can represent a SIP dialog. The SipProxy 838 is an internal utility class used to realize SIP proxy features. The SipEventMapping 840 can be used to translate between SIP stack events (exchanged between transport and transaction) and SIP events (used for application). The SipEventFactory 842 is a utility class used by application developers to create SIP events and associated URI objects.

The transaction layer can be realized by means of the Actor Protocol Context (Actor Protocol Extension), which re-uses the actor scheduler thread, no additional thread mode is introduced.

Figure 9:
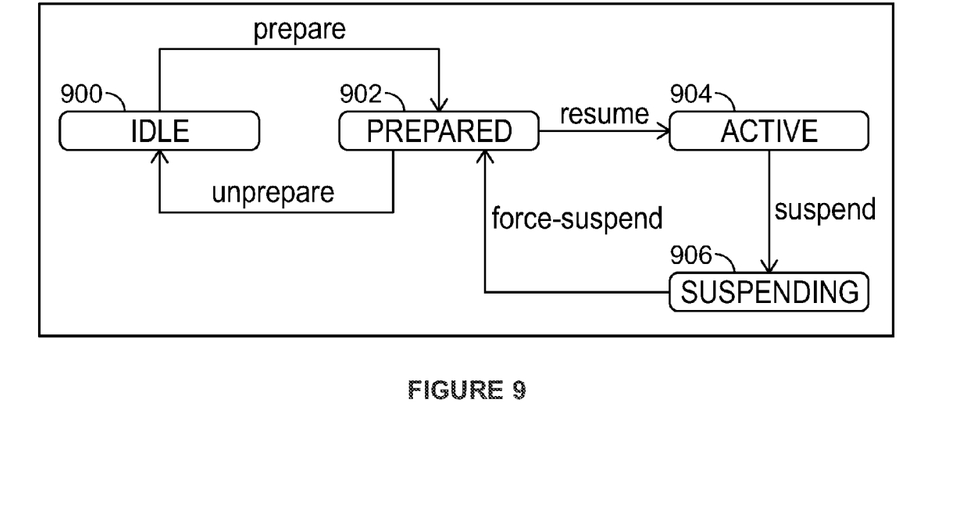
FIG. 9 shows a diagram of lifecycle and integration with PAC, in accordance with an embodiment.

FIG. 9 shows a diagram of lifecycle and integration with PAC, in accordance with an embodiment. At the transition from idle 900 to prepared 902, a configuration API is initialized, a transaction layer/event factory is registered to the actor protocol context, associated utilities are instantiated and the transport is connected to the event broker. When the SIP adapter transitions from prepared to active 904, it starts listening on socket (UDP), initializes NetIO (TCP), and starts transport server runtime. When transitioning from active to suspending 906, the SIP adapter rejects all new initial events and waits for existing connections to terminate. When transitioning from suspending to prepared, the SIP adapter shuts down the socket and stops transport runtime. And when returning to idle from prepared, the SIP adapter unregisters the transaction layer/event factory from the actor protocol context, unregisters runtime Mbeans and disconnects transport with the event broker.

Figure 10:
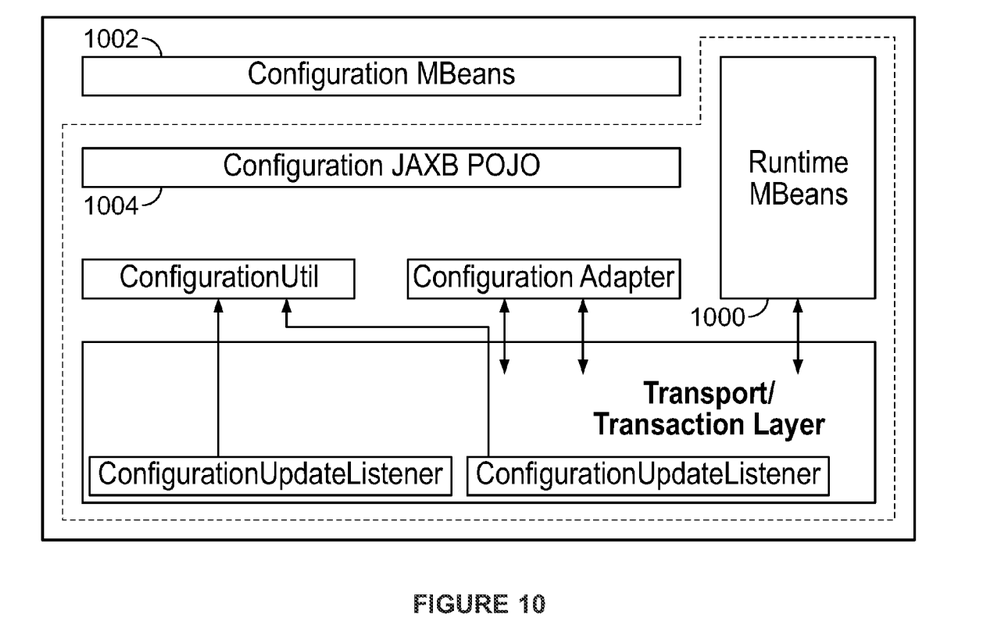
FIG. 10 illustrates the architecture and layer behavior of an SIP adapter, in accordance with an embodiment.

FIG. 10 illustrates the architecture and layer behavior of an SIP adapter, in accordance with an embodiment. Runtime Mbeans 1000 are registered to an Mbean server and read-only from the Administrator perspective, they show SIP adapter runtime statistics. These can include NetworkChannel Statistics and SIP transaction statistics. The NetworkChannel statistics can show the channel name of network accesspoint, the protocol this network accesspoint should use for connections, the number of active connections and sockets associated, the number of messages received, the number of messages sent, the number of messages rejected, the total number of bytes received, and the total number of bytes sent. The Sip Transaction Statistics can show the total number of active actors contain sip transaction object, the total number of active sip sessions, the total number of destroyed actors contain sip transaction object, the total number of destroyed sip sessions, the number of messages received, and the number of messages sent.

The Configuration MBeans 1002 can include a plurality of configuration items which are configured means of JAXB POJO 1004 provided by configuration service and represented as Mbeans automatically. They are read-write from administrator's perspective. The configuration MBeans can include the name of this network accesspoint. The configuration Mbeans can indicate which managed server this network accesspoint is applied to. A value of null indicates that it is applied to whole domain. The configuration Mbeans can also include the protocol this network channel should use for connections, and the IP address or DNSname this network channel uses to listen for incoming connections. A value of null indicates that all network interface will be listened. The ListenAddress_Port indicates the default TCP port this network accesspoint uses to listen for regular (non-SSL) incoming connections. Minimum value: 1, Maximum value: 65535. The ListenAddress_Address Type indicates the address type (e.g., internet) and the ListenAddress_NetworkType indicates the network type (e.g., IP4). The ExternalListenAddress_Host indicates the IP address or DNSname representing the external identity of this network channel. A value of null indicates that the network channel's Listen Address is also its external address. This is required for the configurations which need to cross a firewall doing Network Address Translation. The ExternalListenAddress_Port is the externally published listen port for this network accesspoint. Minimum value: 1, Maximum value: 65535. The ExternalListenAddress_Address Type and ExternalListenAddress_

NetworkType: indicate the address and network type similar to the ListenAddress parameters.

The Complete Message Timeout indicates the maximum amount of time this network accesspoint waits for a complete message to be received. A value of 0 disables network accesspoint complete message timeout. This timeout helps guard against denial of service attacks in which a caller indicates that they will be sending a message of a certain size which they never finish sending. Minimum value: 0 s Maximum value: 480 s. The Idle Connection Timeout indicates the maximum amount of time (in seconds) that a connection is allowed to be idle before it is closed by this network accesspoint. This timeout helps guard against server deadlock through too many open connections. Minimum value: 0 s. The Maximum Message Size indicates the maximum message size allowable in a message header. This maximum attempts to prevent a denial of service attack whereby a caller attempts to force the server to allocate more memory than is available thereby keeping the server from responding quickly to other requests. Minimum value: 4096 bytes Maximum value: 100000000 bytes. The Maximum Connected Clients indicates the maximum number of clients that can be connected on this network accesspoint.

In accordance with an embodiment, the SIP server can include a plurality of elements.

The T1 Timeout Interval represents the duration of the SIP protocol T1 timer, in milliseconds. Timer T1 also specifies the initial values of Timers A, E, and G, which control the retransmit interval for INVITE requests and responses over UDP. Timer T1 affects the values of timers F, H, and J, which control retransmit intervals for INVITE responses and requests; these timers are set to a value of 64 T1 milliseconds. The default is 500 ms.

The T2 Timeout Interval represents the duration of the SIP protocol T2 timer, in milliseconds. Timer T2 defines the retransmit interval for INVITE responses and non-INVITE requests. The default is 4 s.

The T4 Timeout Interval represents the duration of the SIP protocol T4 timer, in milliseconds. Timer T4 specifies the maximum length of time that a message remains in the network. Timer T4 also specifies the initial values of Timers I and K, which control the wait times for retransmitting ACKs and responses over UDP. The default is 5 s.

The Timer B Timeout Interval represents the duration of the SIP protocol Timer B, in milliseconds. Timer B specifies the length of time a client transaction attempts to retry sending a request. If the Timer B value is not configured, the server derives a value from timer T1 (64 T1, or 32000 milliseconds by default). The Timer F Timeout Interval represents the duration of the SIP protocol Timer F, in milliseconds. Timer F specifies the timeout interval for retransmitting non-INVITE requests. If the Timer F value is not configured, the server derives a value from timer T 1 (64 T1, or 32000 milliseconds by default).

In accordance with an embodiment, the Server Header Insertion specifies the conditions for inserting a Server header into SIP messages. Use this attribute to limit or eliminate Server headers to reduce the message size for mobile networks, or to increase security. By default, SIP Server inserts no Server header into SIP messages. The Server Header Value specifies the value of the Server header inserted into SIP messages. The SIP Server enables an administrator to control the text that is inserted into the Server header of generated messages. This provides additional control over the size of SIP messages and also enables you to mask the server entity for security purposes. To configure the header contents, the administrator can enter a string value. By default, SIP Server does not insert a Server header into generated SIP messages. If Server Header Insertion is enabled but no Server Header-value is specified, SIP Server inserts a default value.

In accordance with an embodiment, the Default Form for Header Insertion specifies how the server applies rules for compacting SIP message headers. This element configures the server-wide, default behavior for using or preserving compact headers in SIP messages. This element can be set to one of several different values. When set to compact:, the Sip Adapter uses the compact form for all system-generated headers. However, any headers that are copied from an originating message (rather than generated) use their original form. When set to force compact, the Sip Adapter uses the compact form for all headers, converting long headers in existing messages into compact headers as necessary. When set to long, the Sip Adapter uses the long form for all system-generated headers. However, any headers that are copied from an originating message (rather than generated) use their original form. When set to force long, the Sip Adapter uses the long form for all headers, converting compact headers in existing messages into long headers as necessary.

The Enable DNSServer Lookup element specifies whether the server performs DNS lookup. If this attribute is set to "true," then the server can use DNS to: Discover a proxy server's transport, IP address, and port number when a request is sent to a SIP URI. Resolve an IP address and/or port number during response routing, depending on the contents of the Sent-by field. For proxy discovery, Falcon Sip Adapter uses DNS resolution only once per SIP transaction to determine transport, IP, and port number information. All retransmissions, ACKs, or CANCEL requests are delivered to the same address and port using the same transport. When a proxy needs to send a response message, the Sip Adapter uses DNS lookup to determine the IP address and/or port number of the destination, depending on the information provided in the sent-by field and via header. By default, DNS resolution is not used ("false"). Note: Because DNS resolution is performed within the context of SIP message processing, any DNS performance problems result in increased latency performance. It is recommended to use a caching DNS server in a production environment to minimize potential performance problems.

The Enable Contact Header For Non-Reliable Provisional (1xx) Response element specifies whether the server puts Contact Header in a non-reliable provisional(1xx) response having a To tag. This is not applicable for 100 and possible values are true and false. If this attribute is set to "true," then the server puts a Contact header. The Globally Routable URI is a Globally-Routable User Agent URI (GRUU) that the Sip Adapter automatically inserts into Contact and Route-Set headers when communicating with network elements. The URI specified in this element should be the GRUU for the entire Falcon Sip Adapter cluster. In a single server domain, specify a GRUU for the server itself. Note that User Agents (UAs) deployed on the Sip Adapter typically obtain GRUUs via a registration request. In this case, the application code is responsible both for requesting and subsequently handling the GRUU. To request a GRUU the UA would include the "+sip.instance" Contact header field parameter in each Contact for which GRUU is required. Upon receiving a GRUU, the UA would use the GRUU as the URI for the contact header field when generating new requests. The Enable RPort element specifies whether symmetric response routing is requested (via the rport parameter) for requests generated by Kendo SIP Adapter. When this option is enabled, symmetric response routing is in effect.

In accordance with an embodiment, a Route Header can push a default route header on initial requests if no route header is specified. This is used for S-CSCFURI. Message debugging can be enabled/disabled using the Enable Debug element. By default, message debugging is off (false). The debug level can be set to include a predefined collection of information to log for each SIP request and response. These predefined collections can include terse, which logs only the domain setting, logging level, and whether or not the message is an incoming message; basic, which logs the terse items plus the SIP message status, reason phrase, the type of response or request, the SIP method, the From header, and the To header; and full, which logs the basic items plus all SIP message headers plus the timestamp, protocol, request URI, request type, response type, content type, and raw content.

In accordance with an embodiment, if connection pools are utilized the Pool Name, Destination Host, Destination Port, and Maximum Connections can be specified. SipEvents include the attribute connection_id and node_id (adapter_id). At least for reliable transports such as TCP, the sip stack sends responses back according to the connection which the associated request of same transaction comes in. SipEvents include the attribute SESSION_ID (callId), Therefore regardless of which connection and which node a SIP event comes in, it will be forwarded to one actor by the eventbroker as long as the actor registered the dialog. The CallState of one actor is persisted into the storage service of an actor by protocolExtension, so that the transaction state and call state could survive by actor failing over.

In accordance with an embodiment, SIP-aware actors can implement a SIPProtocolBinding interface to get one instance of an SipEventFactory, which can be called back in an onBind( ) method, between actor.start( ) and actor.resume( ).

In accordance with an embodiment, a SipInboundEventProcessor is provided. The SIP inbound event processor is a utility to provide strong-typed event dispatching. The SipEventFactory is a factory class to create sip outbound event according the inbound event. SIP events are mapped to different event classes according request type in RFC. There is a SipDialogTerminated event, to provide application developers one notification that an SIP dialog (session) has been terminated, without knowing detail of SIP call flows. It is useful when terminating a dialog associated with one or more actors. This event can be used to efficiently and safely perform actor clean-up, including shutdown actor and/or unregister dialog. A best practice is to take advantage of SipDialogTerminated event. The system can automatically generate this event and dispatch it to applications when all SIP transactions within a SIP dialog are terminated. The application can listen for this event and make associated clean-up during the events' call back, without having to take care of the resource issues in signaling FSM. Two useful methods available in this event include getCallId( ) which can be used to identify which dialog is terminated, and getRemainingDialogCount( ) which can be used to know how many ongoing dialogues are still pending by the time this event is generated.

Actor Protocol Context

In accordance with various embodiments, the protocol specific state information is transactionally maintained on the application server on behalf of application programmable units. In accordance with an embodiment, the protocol specific state is maintained transparent to user code. The protocol context includes a suite of APIs to provide more flexibilities for the application developers to program protocol associated applications, as well as a framework to provide protocol adapter developers an opportunity to decorate and validate the protocol events within the context of an actor to make a stateful protocol stack.

Protocol extension enables one abstract class to be registered to an actor framework to decorate an event to/from the actor. PE is designed to be as transparent as possible to application logic. Protocol extension (PE) is used to be the decorator to hook the incoming/outgoing event from/to the actor. Incoming/outgoing events can reject PE and the PE author can decide to filter events or reject events including by implementing a callback and returning a different direction of events. The framework supports decorating events in the same direction, and returning inbound events for outbound events, as well as returning multiple events in different directions.

In accordance with an embodiment, PE is notified when an event fails to dispatch. A PE implementation can choose to return the passed event after handling and give an actor an opportunity to review the event, or return null so that actor will not receive it anymore (useful when a event is generated by the PE itself). It is also possible to start timer in PE. The timerEvent scheduled by PE will not reject the actor but the PE itself, therefore the PE layer timer and application layer timer are isolated. If multiple timers are scheduled, they can be distinguished using event callbacks.

In accordance with an embodiment, one PE instance is created per actor instance. When an actor is started, a PE is started. Similarly, when an actor is revived, a PE is created. When an actor is shutdown, e.g., when an application calls actorLifecycle.suspend( ) the PE makes a final garbage collection and notifies the framework of the shutdown by calling CompletionBarrier.complete( ). If the framework does not receive CompletionBarrier.complete( ) in a specified period, a force stop method can be called to give the PE a chance to make forceful finalizing. When an actor is migrated, the PE can finalize local variables which are not supposed to survive during action migration, and change some run time statistics if required.

In some cases the actor and PE are not supposed to stop work immediately when application decide to shutdown the actor. Therefore the framework will wait to stop the actor, and thus wait to call actor.suspend( ) until the PE notifies the framework that suspending work of PE is finished. As long as CompletionBarrier?.getCallback( ) is called in on Suspend( ) the system will assume a delayed shutdown and wait for the complete notification to finalize other resources. If PE can make sure all the finalize work is already finished in on Suspend( ) it can either explicitly call CompletionBarrier?.getCallback( ) completed( ) or not take any action on Completion Barrier?. The framework will recognize the two cases and consider the PE suspend completed without waiting for a complete notification. This will destroy actor resources immediately.

In accordance with an embodiment, a PE developer can choose to write persistence data into Coherence (such as FSM state which needs to be durable when failing-over/migration).

In accordance with an embodiment, an opened OSGI service of the actor framework can be used when registering a PE. There are two ways to registering a PE. Using OSGi API, protocolName is identical to the attribute ATTRIBUTE_PROTOCOL_NAME in ProtocolEvent?. The framework relies on the parameter protocolName to identify whether a PE is triggered for a specified protocolEvent. Using Declarative APC, by declaring a PE class name in meta-data, the actor framework will auto-recognize it and register it automatically. In this case, the Protocolname? has to be defined as an annotation of ProtocolExtension? class.

Figure 11:
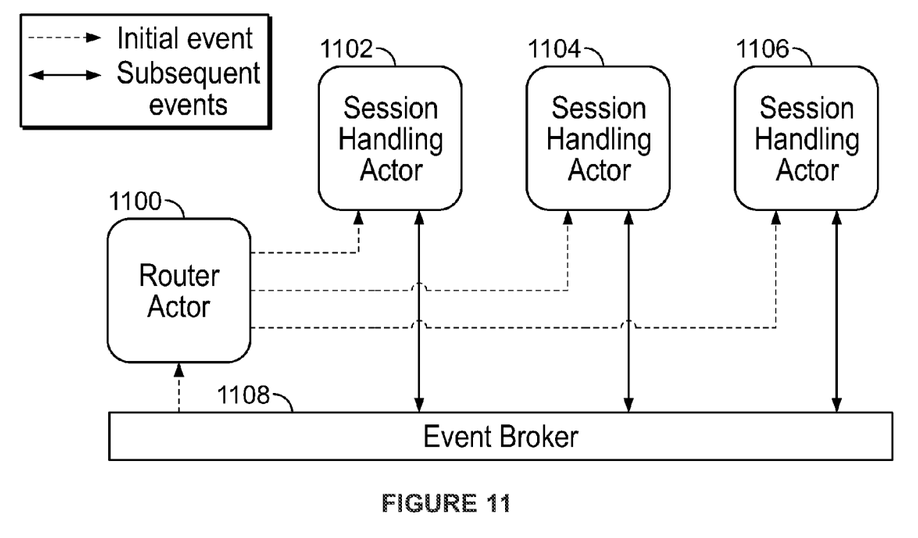
FIG. 11 shows a protocol router, in accordance with an embodiment.

FIG. 11 shows a protocol router, in accordance with an embodiment. A protocol router is used in the "bootstrap" actor (or, router actor) to dispatch an initial event to session handling actors. It could be explicitly registered and unregistered to an actorContext. It can provide a best practice to dispatch the event and load of signaling. As shown in FIG. 11, a router actor 1100 can be established to dispatch an initial event to different session handling actors 1102, 1104, 1106. These session handling actors can be created by the router actor, or created by any other means. Each session handling actor can then communicate with the event broker 1108. A router handler is registered before it can be used. This registration can be performed similarly to registering an eventHandler for an inbound event. An application can register a router via a specified router criteria for each protocol, and overriding the protocol router criteria to have more load dispatching mechanism according the application context.

Figure 12:
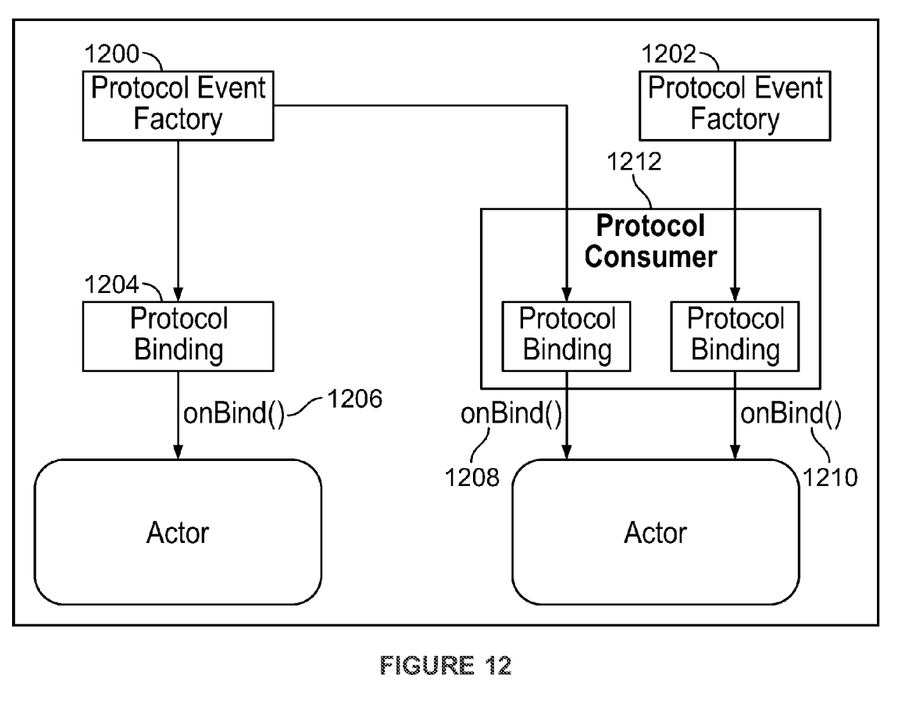
FIG. 12 illustrates the usage of protocol binding and protocol consumer, in accordance with an embodiment.

FIG. 12 illustrates the usage of protocol binding and protocol consumer 1212, in accordance with an embodiment. The framework can provide a shortcut to get a protocol's event factory instance 1200, 1202. The protocol binding interface 1204 is not recommended to be used directly by applications, each protocol adapter can provide a protocol-specified ProtocolBinding? to applications, once an application wants to get an instance of that protocol's event factory, it implements the protocol-specified binding to get the event factory instance in an on Bind( ) callback 1206, 1208, 1210, which is called after actor.start( ) but before actor.resume( )actor.revive( ). The framework also relies on the protocol name information in ProtocolBinding to trigger ProtocolExtension. One actor utilize multiple protocols (e.g. Sip and Diameter). In this case implementing one ProtocolBinding may not be sufficient, and ProtocolConsumer 1212 could help on this. Using ProtocolConsumer one could get an array of callBacks in ProtocolBindings. Although ProtocolConsumer 1212could be used for only one protocol, it is more complicated compared with ProtocolBinding 1204, so it is recommended for use in the multiple protocol case.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system comprising:
   a session initiation protocol (SIP) adapter, wherein the SIP adapter implements connection oriented protocols and mediates interactions with application code in an application server;
   wherein said SIP adapter comprises
      a plurality of transport modules which receive a plurality of SIP messages associated with a plurality of calls in a telecommunications network and received via said connection oriented protocols over a plurality of connections,
      a parser which parses frames from said plurality of SIP communications and generates SIP stack events responsive to said SIP communications wherein each SIP stack event includes a connection id attribute corresponding to one of said plurality of connections, and
      an SIP event handler which dispatches said SIP stack events to an event broker;
   a plurality of stateful sever nodes each comprising a microprocessor and a memory;
   a plurality of call state objects hosted on the plurality of stateful server nodes, each of said plurality of call state objects corresponding to one of said plurality of calls;
   a plurality of actors wherein each actor owns one of said plurality of call state objects and wherein each actor comprises application code for handling the call associated with the call state object owned by the actor;
   wherein each of said plurality of call state objects comprises a transaction state object which includes a protocol layer state machine of a transaction of the call associated with the call state object; and
   an actor message handler which communicates said SIP stack events from the event broker to said plurality of call state objects;
   whereby the SIP adapter provides stateless node mapping of said SIP messages and said SIP stack events to said plurality of stateful server nodes hosting said plurality of call state objects corresponding to said plurality of calls and said plurality of actors associated with said plurality of call state objects.

2. The system of claim 1 wherein actor call state of an actor is persisted into the call state object owned by the actor by a protocol extension.

3. The system of claim 2 wherein one protocol extension instance is created per actor.

4. The system of claim 1 wherein actor call state of an actor is persisted into the call state object owned by the actor by a protocol extension to support survival of actor call state by actor failover.

5. The system of claim 1 wherein each of said plurality of call state objects comprises a SIP session object representing an SIP dialog.

6. The system of claim 1, further comprising a call state manager which manages said plurality of call state objects.

7. The system of claim 1, further comprising a Transaction Manager used to create and manage server/client SIP transactions and put the SIP transactions into a call state object of the plurality of call state objects.

8. A method comprising:
providing a session initiation protocol (SIP) adapter, wherein the SIP adapter implements connection oriented protocols and mediates interactions with application code in an application server, and wherein said SIP adapter comprises a plurality of transport modules, a parser and an SIP event handler;
receiving with said plurality of transport modules a plurality of SIP messages associated with a plurality of calls in a telecommunications network and received via said connection oriented protocols over a plurality of connections;
using said parser to parse frames from said plurality of SIP communications and generate SIP stack events responsive to said SIP communications wherein each SIP stack event includes a connection_id attribute corresponding to one of said plurality of connections, using said SIP event handler to dispatch said SIP stack events to an event broker;
providing a plurality of call state objects hosted on a plurality of stateful server nodes, each of said plurality of call state objects corresponding to one of said plurality of calls;
providing a plurality of actors wherein each actor owns one of said plurality of call state objects and wherein each actor comprises application code for handling the call associated with the call state object owned by the actor;
providing a transaction state object in each of said call state objects wherein the transaction state object includes a protocol layer state machine of a transaction of the call associated with the call state object; and
communicating said SIP stack events from the event broker to said plurality of call state objects using an actor message handler;
whereby the SIP adapter provides stateless node mapping of said SIP messages and said SIP stack events to said plurality of stateful server nodes hosting said plurality of call state objects corresponding to said plurality of calls and said plurality of actors associated with said plurality of call state objects.

9. The method of claim 8, further comprising persisting actor call state of an actor into the call state object owned by the actor using a protocol extension.

10. The method of claim 9, further comprising creating one protocol extension instance per actor.

11. The method of claim 8, further comprising persisting actor call state of an actor is persisted into the call state object owned by the actor using a protocol extension to support survival of actor call state by actor failover.

12. The method of claim 8, wherein each of said plurality of call state objects comprises a SIP session object representing an SIP dialog.

13. The method of claim 8, further comprising providing a call state manager to manage said plurality of call state objects.

14. The method of claim 8, providing a Transaction Manager to create and manage server/client SIP transactions and put said server/client SIP transactions into a call state object of the plurality of call state objects.

15. A non-transitory computer readable medium having instructions stored thereon, which instructions, when executed, cause a computer system to perform steps comprising:
providing a session initiation protocol (SIP) adapter, wherein the SIP adapter implements connection oriented protocols and mediates interactions with application code in an application server, and wherein said SIP adapter comprises a plurality of transport modules, a parser and an SIP event handler;
receiving with said plurality of transport modules a plurality of SIP messages associated with a plurality of calls in a telecommunications network and received via said connection oriented protocols over a plurality of connections;
using said parser to parse frames from said plurality of SIP communications and generate SIP stack events responsive to said SIP communications wherein each SIP stack event includes a connection_id attribute corresponding to one of said plurality of connections, using said SIP event handler to dispatch said SIP stack events to an event broker;
providing a plurality of call state objects hosted on a plurality of stateful server nodes, each of said plurality of call state objects corresponding to one of said plurality of calls;
providing a plurality of actors wherein each actor owns one of said plurality of call state objects and wherein each actor comprises application code for handling the call associated with the call state object owned by the actor;
providing a transaction state object in each of said call state objects wherein the transaction state object includes a protocol layer state machine of a transaction of the call associated with the call state object; and
communicating said SIP stack events from the event broker to said plurality of call state objects using an actor message handler;
whereby the SIP adapter provides stateless node mapping of said SIP messages and said SIP stack events to said plurality of stateful server nodes hosting said plurality of call state objects corresponding to said plurality of calls and said plurality of actors associated with said plurality of call state objects.

16. The non-transitory computer readable medium of claim 15 having further instructions stored thereon, which further instructions, when executed, cause a computer system to perform further steps comprising:
creating one protocol extension instance for each actor;
persisting actor call state of each actor into the call state object owned by each actor using the protocol extension created for each actor; and
supporting survival of actor call state by actor failover.

17. The non-transitory computer readable medium of claim 15, wherein each of said plurality of call state objects comprises a SIP session object representing an SIP dialog.

18. The non-transitory computer readable medium of claim 15 having further instructions stored thereon, which further instructions, when executed, cause a computer system to perform further steps comprising:
    providing a call state manager to manage said plurality of call state objects.

19. The non-transitory computer readable medium of claim 15 having further instructions stored thereon, which further instructions, when executed, cause a computer system to perform further steps comprising:
    providing a Transaction Manager to create and manage server/client SIP transactions and put said server/client SIP transactions into each call state object of the plurality of call state objects.

20. The non-transitory computer readable medium of claim 15 having further instructions stored thereon, which further instructions, when executed, cause a computer system to perform further steps comprising:
    providing a call state manager to manage said plurality of call state objects; and
    providing a Transaction Manager to create and manage server/client SIP transactions and put said server/client SIP transactions into each call state object of the plurality of call state objects.

* * * * *